United States Patent
Lin et al.

(10) Patent No.: US 11,328,506 B2
(45) Date of Patent: May 10, 2022

(54) CROP IDENTIFICATION METHOD AND COMPUTING DEVICE

(71) Applicant: Ping An Technology (Shenzhen) Co., Ltd., Shenzhen (CN)

(72) Inventors: Ruei-Sung Lin, Redwood City, CA (US); Nan Qiao, Redwood City, CA (US); Yi Zhao, Santa Clara, CA (US); Bo Gong, Belmont, CA (US); Mei Han, Palo Alto, CA (US)

(73) Assignee: Ping An Technology (Shenzhen) Co., Ltd., Shenzhen (CN)

( * ) Notice: Subject to any disclaimer, the term of this patent is extended or adjusted under 35 U.S.C. 154(b) by 262 days.

(21) Appl. No.: 16/727,788

(22) Filed: Dec. 26, 2019

(65) Prior Publication Data

US 2021/0201024 A1 Jul. 1, 2021

(51) Int. Cl.
*G06T 5/00* (2006.01)
*G06T 5/20* (2006.01)
*G06K 9/62* (2022.01)
*G06V 20/10* (2022.01)

(52) U.S. Cl.
CPC ......... *G06V 20/188* (2022.01); *G06K 9/6215* (2013.01); *G06K 9/6277* (2013.01); *G06T 5/002* (2013.01); *G06T 5/20* (2013.01); *G06T 2207/10032* (2013.01); *G06T 2207/30188* (2013.01)

(58) Field of Classification Search
CPC .............. G06K 9/6277; G06K 9/6215; G06K 9/00657; G06K 9/624; G06T 5/002; G06T 5/20; G06T 7/0012; G06T 2207/20076; G06T 2207/30188; G06T 2207/10032; G06V 20/188; G06V 20/194
See application file for complete search history.

(56) References Cited

U.S. PATENT DOCUMENTS

2018/0189564 A1* 7/2018 Freitag ................ G06V 20/188

OTHER PUBLICATIONS

Lin, C. H. U., et al. "Monitoring of winter wheat distribution and phenological phases based on MODIS time-series: A case study in the Yellow River Delta, China." Journal of integrative agriculture 15.10 (2016): 2403-2416. (Year: 2016).*

(Continued)

*Primary Examiner* — Vu Le
*Assistant Examiner* — Tracy Mangialaschi
(74) *Attorney, Agent, or Firm* — ScienBiziP, P.C.

(57) ABSTRACT

In a crop identification method, multi-temporal sample remote sensing images labeled with first planting blocks of a specific crop are acquired. NDVI data of the sample remote sensing images are calculated. Noise of the NDVI data is reduced. A first multivariate Gaussian model is fitted based on de-noised NDVI data of the sample remote sensing image. Multi-temporal target remote sensing images are acquired. An NDVI time series of each pixel in the target remote sensing image is constructed. The NDVI time series is input to the first multivariate Gaussian model to obtain a likelihood value of each pixel displaying the specific crop in the remote sensing images. Second planting blocks of the specific crop in the target remote sensing images are determined accordingly. An accurate and robust identification result is thereby achieved.

11 Claims, 3 Drawing Sheets

(56) References Cited

OTHER PUBLICATIONS

Skakun, Sergii, et al. "Early season large-area winter crop mapping using MODIS NDVI data, growing degree days information and a Gaussian mixture model." Remote Sensing of Environment 195 (2017): 244-258. (Year: 2017).*
Haerani, Haerani, Armando Apan, and Badri Basnet. "Mapping of peanut crops in Queensland, Australia, using time-series PROBA-V 100-m normalized difference vegetation index imagery." Journal of Applied Remote Sensing 12.3 (2018): 036005. (Year: 2018).*
Zhang XW, Liu JF, Qin Z, Fen QI. Winter wheat identification by integrating spectral and temporal information derived from multi-resolution remote sensing data. Journal of Integrative Agriculture. Nov. 1, 2019;18(11):2628-43. (Year: 2019).*
Xiao, Guofeng, et al. "A spatialization method for grain yield statistical data: A study on winter wheat of Shandong Province, China." Agronomy Journal 111.4 (2019): 1892-1903. (Year: 2019).*

* cited by examiner

CROP IDENTIFICATION METHOD AND COMPUTING DEVICE

FIELD

The subject matter herein generally relates to image processing, and particularly to a crop identification method and a computing device.

BACKGROUND

Crop identification is a basis for crop growth monitoring and yield forecasting. Due to the diversity of crops, there are obvious spectral overlaps between different crops. A phenomenon of "same objects different spectral values" and "different objects same spectral values" may occur in crop identification based on mono-temporal remote sensing images, resulting in low classification accuracy.

In addition, most of existing crop identification methods uses classification rules specified by agricultural experts, which are difficult to apply to different geographical areas and different crops.

DETAILED DESCRIPTION

The present disclosure is given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. Described embodiments are merely embodiments which are a part of the present disclosure, and do not include every embodiment. All other embodiments obtained by those of ordinary skill in the art based on the embodiments of the present disclosure without creative efforts are within the scope of the claims.

Unless defined otherwise, all technical and scientific terms herein have the same meaning as used in the field of the art technology as generally understood. The terms used in the present disclosure are for the purposes of describing particular embodiments and are not intended to limit the present disclosure.

A crop identification method can be applied to one or more computing devices. A computing device is a device capable of automatically performing numerical calculation and/or information processing according to an instruction set or stored in advance, and the hardware thereof includes, but is not limited to, a microprocessor, an application specific integrated circuit (ASIC), a field-programmable gate array (FPGA), a digital signal processor (DSP), or an embedded device, etc.

The computing device may be a desktop computer, a notebook, a palmtop computer, and a cloud server. The computing device can perform a human-computer interaction with a user through a keyboard, a mouse, a remote controller, a touch panel, or a voice control device.

Figure 1:
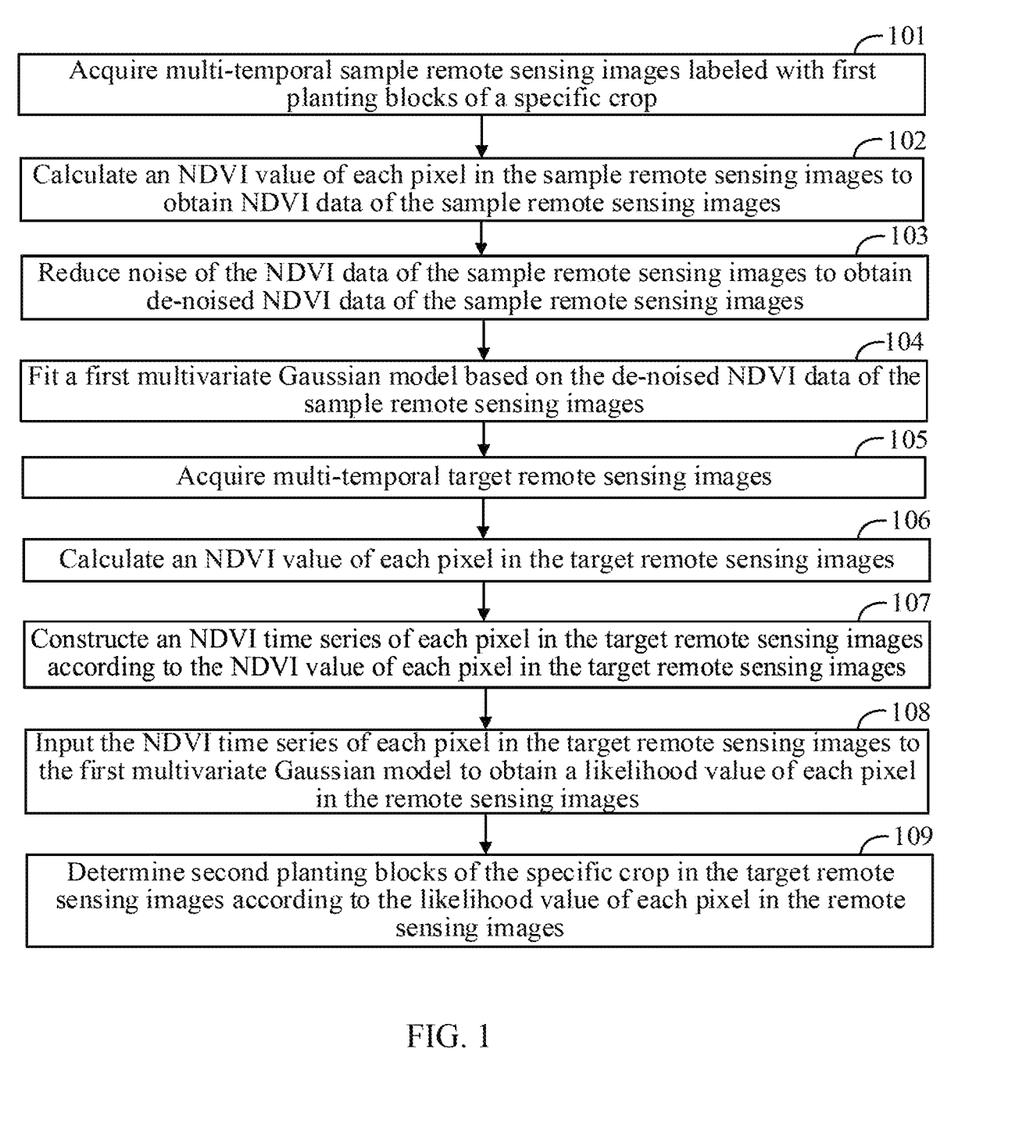
FIG. 1 is a flowchart of an embodiment of a crop identification method.

FIG. 1 is a flowchart of an embodiment of a crop identification method. In one embodiment, the method can be executed by a computing device. The method may accurately identify planting blocks of a specific crop (corn, for example) in remote sensing images.

The illustrated order of blocks in FIG. 1 is illustrative only and the order of the blocks can be changed according to different requirements. Additional blocks can be added or fewer blocks may be utilized without departing from this disclosure.

At block 101, the computing device may acquire multi-temporal sample remote sensing images (hereinafter, "sample remote sensing images") labeled with first planting blocks of the specific crop.

The sample remote sensing images are used as training data. In one embodiment, the method is used for corn identification, and the sample remote sensing images are labeled with sample corn planting blocks. In another embodiment, the method is used for rice identification, and the sample remote sensing images are labeled with sample rice planting blocks.

The sample remote sensing images are a set of remote sensing images taken of a same geographical area on several dates. Each of the sample remote sensing images corresponds to a certain date. In one embodiment, the sample remote sensing images are taken at key phenological stages of the specific crop.

The sample remote sensing images may include values of reflected radiation in different regions of the spectrum. In one embodiment, the sample remote sensing images may include values of reflected radiation in blue, green, red, and near-infrared regions of the spectrum.

The sample remote sensing images may be satellite images or aerial images. Satellite images are obtained by taking pictures or scanning a surface of the Earth with the help of artificial satellites. Aerial images are obtained by taking pictures or scanning of the surface of the Earth with the help of aircraft (airplanes or helicopters, for example).

In one embodiment, the sample remote sensing images may be Gaofen satellite No. 1 Wide Field View (GF-1 WFV) images. The sample remote sensing images may be acquired from an image database, such as a satellite image database.

The first planting blocks are blocks of land in the sample remote sensing images where the specific crop is planted. The first planting blocks may be determined according to a vector map of the specific crop.

At block 102, the computing device may calculate a normalized difference vegetation index (NDVI) value of each pixel in the sample remote sensing images to obtain NDVI data of the sample remote sensing images.

The NDVI value of each pixel in the sample remote sensing images may be calculated according to the formula:

$$NDVI = \frac{NIR}{NIR + R}.$$

In the formula, "NIR", "R" are values of reflected radiation in the near infrared and the red regions of the spectrum, respectively.

In one embodiment, the computing device may pre-process the sample remote sensing images before calculating the NDVI value of each pixel in the sample remote sensing images.

In one embodiment, pre-processing the sample remote sensing images may include: correcting the sample remote sensing images; registering the sample remote sensing images; cropping the sample remote sensing images and adjusting sizes of cropped sample remote sensing images to a uniform size.

The correcting of the sample remote sensing images is to correct distortion caused during imaging. Correction of the sample remote sensing images may include geometric correction and atmospheric correction of the sample remote sensing images. The geometric correction is to eliminate or correct geometric errors of the sample remote sensing images. The atmospheric correction is to eliminate influence of environmental factors such as atmosphere and light on reflected radiation.

Registering the sample remote sensing images is to obtain an alignment between every two sample remote sensing images. Free-form B-spline deformation method may be used to register the sample remote sensing images.

The purpose of cropping the sample remote sensing images is to remove non-survey regions from the sample remote sensing images to obtain survey regions in the sample remote sensing images. A rectangle that includes the survey regions may be defined and used to crop the sample remote sensing images.

Cropped sample remote sensing images may be of different sizes. The cropped sample remote sensing images may be adjusted to a uniform size. In one embodiment, a minimum size (a minimum quantity of pixels, for example) of the sample remote sensing images may be determined, all cropped sample remote sensing images may be adjusted to the minimum size.

In other embodiments, other pre-processing, such as shadow removal, may be performed on the sample remote sensing images.

At block 103, the computing device may reduce noise of the NDVI data of the sample remote sensing images to obtain de-noised NDVI data of the sample remote sensing images.

In one embodiment, reducing noise of the NDVI data of the sample remote sensing images may include: performing a Gaussian smoothing on the NDVI data of the sample remote sensing images.

For example, a 5×5 matrix that obeys a bivariate Gaussian distribution may be used to perform the Gaussian smoothing on the NDVI data of the sample remote sensing images.

The bivariate Gaussian distribution may be defined as:

$$G(u, v) = \frac{1}{2\pi\sigma^2} e^{-(u^2+v^2)/(2\sigma^2)}.$$

In the formula, "G" is a probability density of the Gaussian distribution, "u" and "v" are independent variables belonging to real number domain, and "σ" is a parameter of the bivariate Gaussian distribution and is a real number greater than 0.

Noise reduction of the NDVI data of the sample remote sensing data may reduce influence of noise on a crop identification model (i.e., first multivariate Gaussian model described later) and improve a robustness of the crop identification model.

At block 104, the computing device may fit a first multivariate Gaussian model based on the de-noised NDVI data of the sample remote sensing images.

In one embodiment, fitting the first multivariate Gaussian model based on the de-noised NDVI data of the sample remote sensing images may include: determining an average NDVI value of each first planting block according to the de-noised NDVI data of the sample remote sensing images; and fitting the first multivariate Gaussian model according to the average NDVI value of each first planting block of the sample remote sensing images.

In one embodiment, determining an average NDVI value of each first planting block according to the de-noised NDVI data of the sample remote sensing images may include sub-steps (11)-(13).

(11) For each first planting block, fitting a univariate Gaussian model according to de-noised NDVI data of the first planting block of a single date, where a mean of the univariate Gaussian model is an average value of the de-noised NDVI data of the first planting block, and a variance of the univariate Gaussian model is a variance of the de-noised NDVI data of the first planting block.

(12) Calculating a first distance from each pixel in the first planting block to a distribution center of the univariate Gaussian model according to the de-noised NDVI data of a single date of the first planting block.

(13) Excluding the pixel from the first planting block if the first distance is greater than or equal to a first preset value (3 standard deviations, for example);

Sub-steps (11)-(13) may be repeated several times (for example, 3 times) to obtain a final univariate Gaussian model that is stable. A distribution center of the final univariate Gaussian model may be determined as the average NDVI value of the first planting block.

When repeating (11), a new univariate Gaussian model is fitted according to de-noised NDVI data of remaining pixels in the first planting block.

Excluding pixels that are too far from the distribution center of the univariate Gaussian model effectively reduces an impact of abnormal values of the sample remote sensing images and improves a robustness of the crop identification method.

In one embodiment, before fitting a univariate Gaussian model according to de-noised NDVI data of the first planting block of a single date, the crop identification method may further include: determining whether quantity of pixels in a first planting block is less than a first preset number (50, for example); discarding the first planting block if the quantity of pixels in the first planting block is less than the first preset number.

In another embodiment, determining an average NDVI value of each first planting block according to the de-noised NDVI data of the sample remote sensing images may include sub-steps (21)-(23).

(21) For each first planting block, fitting a second multivariate Gaussian model according to noise-reduced NDVI data of all dates of the first planting block.

(22) calculating a second distance from each pixel in the first planting block to a distribution center of the second multivariate Gaussian model according to the noise-reduced NDVI data of all dates of the first planting block.

(23) excluding the pixel from the first planting block if the second distance is greater than or equal to a second preset value.

Sub-steps (21)-(23) may be repeated several times (for example, 3 times) to obtain a final second multivariate Gaussian model that is stable. A distribution center of the final second multivariate Gaussian model may be determined as the average NDVI value of the first planting block.

When repeating (21), a new second multivariate Gaussian model is fitted according to de-noised NDVI data of remaining pixels in the first planting block.

The second distance from each pixel in the first planting block to the distribution center of the second multivariate Gaussian model may be a square of a Mahalanobis distance from the pixel to the distribution center of the second multivariate Gaussian model.

Alternatively, the second distance from each pixel in the first planting block to the distribution center of the second multivariate Gaussian model may be a Mahalanobis distance from the pixel to the distribution center of the second multivariate Gaussian model.

Fitting the second multivariate Gaussian distribution means that, for each pixel, the de-noised NDVI data of all dates are used as features to estimate a mean and a covariance matrix of the second multivariate Gaussian distribution.

Method of fitting the second multivariate Gaussian distribution refers to known related technologies and details are not described herein.

In one embodiment, before fitting the second multivariate Gaussian model according to the noise-reduced NDVI data of all dates of the first planting block, the crop identification method may further include: determining whether the quantity of pixels in the first planting block is less than a second preset number; and discarding the first planting block if the quantity of pixels in the first planting block is less than the second preset number.

After the average NDVI value of each first planting block is obtained, the first multivariate Gaussian model may be fitted according to the average NDVI value of each first planting block.

The present disclosure fits the first multivariate Gaussian model for crop identification for two reasons: firstly, for a remote sensing image taken on each date, NDVI distributions of same crop may approximate to the Gaussian distribution; secondly, NDVI distributions of other crops of each date may be close to NDVI distributions of the specific crop, but in general, the NDVI distributions of other crops deviate from the NDVI distributions of the specific crop. Multivariate Gaussian model can make best use of the advantages and bypass the disadvantages, and achieve a better identification result.

In one embodiment, fitting the first multivariate Gaussian model according to the average NDVI value of each first planting block of the sample remote sensing images may include sub-steps (31)-(33).

(31) Calculating a covariance matrix and a mean of the first multivariate Gaussian model.

In one embodiment, the covariance matrix of the second multivariate Gaussian model may be calculated by:

$$\sum = \frac{1}{\sum_{i=1}^{N} n_i} \sum_{i=1}^{N} n_i (x_i - \mu^*)^T (x_i - \mu^*).$$

The mean of the first multivariate Gaussian model may be calculated by:

$$\mu^* = \frac{\sum_{i=1}^{N} n_i x_i}{\sum_{i=1}^{N} n_i}$$

In the formula, "$x_i$" represents an average NDVI value of the (i)th first planting block, "$n_i$" represents quantity of remaining pixels in the first planting block, and "N" represents a quantity of the first planting blocks.

(32) Calculating a third distance from the first planting block to a distribution center of the first multivariate Gaussian model according to average NDVI values of all dates of the first planting block.

The third distance from the first planting block to the distribution center of the first multivariate Gaussian model may be a Mahalanobis distance from the first planting block to the distribution center of the first multivariate Gaussian model squared.

Alternatively, the third distance from the first planting block to the distribution center of the first multivariate Gaussian model may be the Mahalanobis distance from the first planting block to the distribution center of the first multivariate Gaussian model.

(33) excluding the first planting block from the sample remote sensing images if the third distance is greater than or equal to a third preset value.

Sub-steps (31)-(33) may be repeated several times (for example, 3 times) to obtain a final first multivariate Gaussian model that is stable.

At block 105, the computing device may acquire multi-temporal target remote sensing images (hereinafter, "target remote sensing images").

The target remote sensing images are images to be identified.

The target remote sensing images are a set of remote sensing images taken on a same geographical area on different dates. Each of the target remote sensing images corresponds to a certain date. In one embodiment, the target remote sensing images are taken at key phenological stages of the specific crop.

The target remote sensing images may include values of reflected radiation in different regions of the spectrum. In one embodiment, the target remote sensing images may include values of reflected radiation in blue, green, red, and near-infrared regions of the spectrum.

In one embodiment, the target remote sensing images may be GF-1 WFV images.

At block 106, the computing device may calculate an NDVI value of each pixel in the target remote sensing images.

Calculating the NDVI value of each pixel in the target remote sensing images may refer to calculation of the NDVI value of each pixel in the sample remote sensing images.

In one embodiment, the computing device may pre-process the target remote sensing images before calculating the NDVI value of each pixel in the target remote sensing images.

In one embodiment, pre-processing the target remote sensing images may include: correcting the target remote sensing images; registering the target remote sensing images; cropping the target remote sensing images, and adjusting sizes of cropped target remote sensing images to a uniform size.

At block 107, the computing device may construct an NDVI time series of each pixel in the target remote sensing images according to the NDVI value of each pixel in the target remote sensing images.

The NDVI time series of each pixel in the target remote sensing image may be obtained by sorting NDVI values of each pixel in the target remote sensing image in time sequence according to date when the target remote sensing image is taken.

At block 108, the computing device may input the NDVI time series of each pixel in the target remote sensing images to the first multivariate Gaussian model to obtain a likelihood value of each pixel in the remote sensing images.

The likelihood value indicates a likelihood that each pixel in the target remote sensing image is displaying the specific crop.

The first multivariate Gaussian model performs a prediction on each pixel in the target remote sensing images according to the NDVI time series of the pixel to obtain the likelihood value of the pixel.

At block 109, the computing device may determine second planting blocks of the specific crop in the target remote sensing images according to the likelihood value of each pixel in the remote sensing images.

The second planting blocks are blocks of land in the target remote sensing images where the specific crop is planted.

In one embodiment, determining second planting blocks of the specific crop in the target remote sensing images according to the likelihood value of each pixel in the remote sensing images may include: determining the second planting blocks of the specific crop in the target remote sensing images according to the likelihood value of each pixel in the remote sensing images using an image segmentation algorithm.

The first multivariate Gaussian model identifies whether a pixel in the target remote sensing images is the specific crop based on characteristics of the pixel. As a result, the pixels identified as displaying the specific crop in the target remote sensing images may be geographically dispersed in some areas, which does not conform to a general rule of crop planting. Image segmentation makes use of geospatial information to make the second planting blocks of the specific crops in the target remote sensing image more complete and a crop identification result more accurate.

Image segmentation is to combine pixels with a certain similarity to form a region. A final classification result of each pixel depends not only on the likelihood value of the pixel, but also on neighboring pixels.

An energy equation for image segmentation is:

$$E(f) = \Sigma_{p \in E} \psi_1(z_p, c_p) + \Sigma_{p,q \in E} \psi_2(z_p, z_q)$$

In the energy equation, "$c_p$" represents two categories defined by the image segmentation algorithm, namely specific crop and non-specific crop. "$z_p$" and "$z_q$" represents pixels in the target remote sensing images. "$\psi_1$" represents the likelihood value of each pixel in the target remote sensing images. "$\psi 2$" represents a correlation between two pixels, defined as $\exp(-|z_p - z_q|)$, which means that the closer two pixels are, the greater is the correlation, and the more easily can the two pixels be classified into one category.

The second planting blocks may be segmented from the target remote sensing images according to the min-cut/max-flow theorem.

In other embodiments, if the likelihood value of a pixel in the target remote sensing images is greater than or equal to a preset threshold (0.8, for example), the pixel may be identified as displaying the specific crop. Otherwise, if the likelihood value of the pixel is less than the preset threshold, the pixel is identified as displaying a non-specific crop.

The present disclosure uses multi-temporal remote sensing images to identify type. A phenomenon of "same objects different spectral values" and "different objects same spectral values" in crop identification based on mono-temporal temporal images is overcome. The present disclosure establishes a statistical model based on multi-temporal sample remote sensing images, and the assistance of professional agronomic knowledge is not required for any part of the entire process. Therefore, the model is easily applied to other geographical areas or crops. An accurate and robust identification result is achieved.

Figure 2:
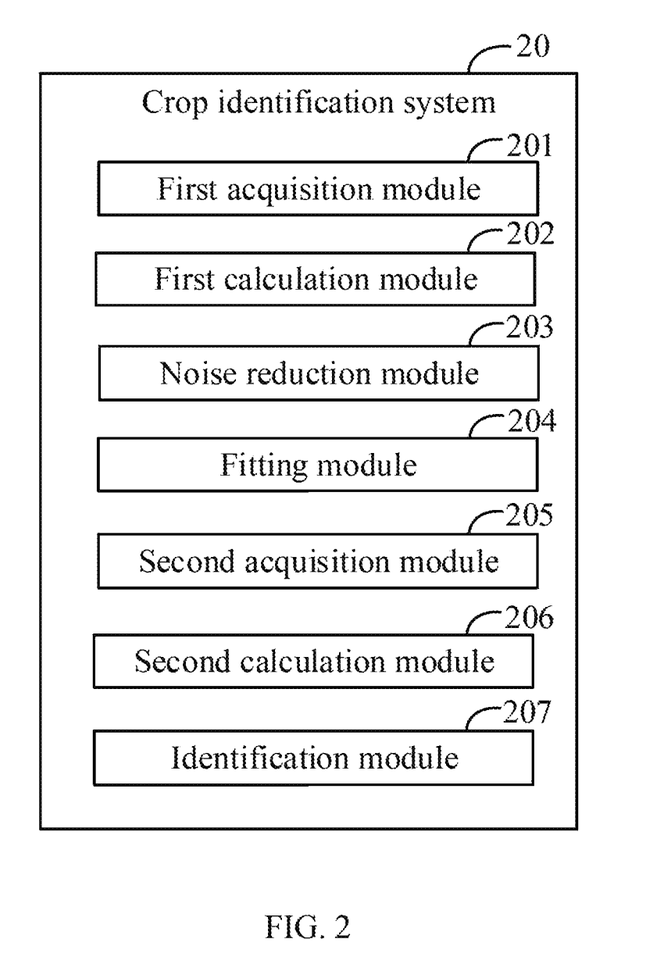
FIG. 2 is a block diagram of an embodiment of function modules of a crop identification system.

FIG. 2 is a block diagram of an embodiment of function modules of a crop identification system. The system 20 is used to accurately identify planting blocks of a specific crop (corn, for example) in remote sensing images.

The system 20 runs in a computing device. The system 20 can include a plurality of modules. The plurality of modules can comprise computerized instructions in a form of one or more computer-readable programs that can be stored in a non-transitory computer-readable medium (e.g., a storage device of the computing device), and executed by at least one processor of the computing device.

In at least one embodiment, the system 20 can include a plurality of modules. The plurality of modules can include, but is not limited to, a first acquisition module 201, a first calculation module 202, a noise reduction module 203, a fitting module 204, a second acquisition module 205, a second calculation module 206, and an identification module 207. The modules 201-207 can comprise computerized instructions in the form of one or more computer-readable programs that can be stored in the non-transitory computer-readable medium (e.g., the storage device of the computing device), and executed by the at least one processor of the computing device.

The first acquisition module 201 may acquire multi-temporal sample remote sensing images (hereinafter, "sample remote sensing images") labeled with first planting blocks of the specific crop.

The sample remote sensing images are used as training data. In one embodiment, the method is used for corn identification, and the sample remote sensing images are labeled with sample corn planting blocks. In another embodiment, the method is used for rice identification, and the sample remote sensing images are labeled with sample rice planting blocks.

The sample remote sensing images are a set of remote sensing images taken of a same geographical area on several dates. Each of the sample remote sensing images corresponds to a certain date. In one embodiment, the sample remote sensing image are taken at key phenological stages of the specific crop.

The sample remote sensing images may include values of reflected radiation in different regions of the spectrum. In one embodiment, the sample remote sensing images may include values of reflected radiation in blue, green, red, and near-infrared regions of the spectrum.

The sample remote sensing images may be satellite images or aerial images. Satellite images are obtained by taking pictures or scanning a surface of the Earth with the help of artificial satellites. Aerial images are obtained by taking pictures or scanning of the surface of the Earth with the help of aircraft (airplanes or helicopters, for example).

In one embodiment, the sample remote sensing images may be Gaofen satellite No. 1 Wide Field View (GF-1 WFV) images. The sample remote sensing images may be acquired from an image database, such as a satellite image database.

The first planting blocks are blocks of land in the sample remote sensing images where the specific crop is planted. The first planting blocks may be determined according to a vector map of the specific crop.

The first calculation module 202 may calculate a normalized difference vegetation index (NDVI) value of each pixel in the sample remote sensing images to obtain NDVI data of the sample remote sensing images.

The NDVI value of each pixel in the sample remote sensing images may be calculated by:

$$NDVI = \frac{NIR - R}{NIR + R}.$$

In the formula, "NIR", "R" are values of reflected radiation in the near infrared and the red regions of the spectrum, respectively.

In one embodiment, the computing device may pre-process the sample remote sensing images before calculating the NDVI value of each pixel in the sample remote sensing images.

In one embodiment, pre-processing the sample remote sensing images may include: correcting the sample remote sensing images; registering the sample remote sensing images; cropping the sample remote sensing images, and adjusting sizes of cropped sample remote sensing images to a uniform size.

The purpose of correcting the sample remote sensing images is to correct distortion caused during imaging. Correction of the sample remote sensing images may include geometric correction and atmospheric correction of the sample remote sensing images. The geometric correction is to eliminate or correct geometric errors of the sample remote sensing images. The atmospheric correction is to eliminate influence of environmental factors such as atmosphere and light on reflected radiation.

Registering the sample remote sensing images is to obtain an alignment between every two sample remote sensing images. Free-form B-spline deformation method may be used to register the sample remote sensing images.

The purpose of cropping the sample remote sensing images is to remove non-survey regions from the sample remote sensing images to obtain survey regions in the sample remote sensing images. A rectangle that includes the survey regions may be defined and used to crop the sample remote sensing images.

Cropped sample remote sensing images may be of different sizes. The cropped sample remote sensing images may be adjusted to a uniform size. In one embodiment, a minimum size (a minimum quantity of pixels, for example) of the sample remote sensing images may be determined, all cropped sample remote sensing images may be adjusted to the minimum size.

In other embodiments, other pre-processing, such as shadow removal, may be performed on the sample remote sensing images.

The noise reduction module 203 may reduce noise of the NDVI data of the sample remote sensing images to obtain de-noised NDVI data of the sample remote sensing images.

In one embodiment, reducing noise of the NDVI data of the sample remote sensing images may include: performing a Gaussian smoothing on the NDVI data of the sample remote sensing images.

For example, a 5×5 matrix that obeys a bivariate Gaussian distribution may be used to perform the Gaussian smoothing on the NDVI data of the sample remote sensing images.

The bivariate Gaussian distribution is:

$$G(u, v) = \frac{1}{2\pi\sigma^2} e^{-(u^2+v^2)/(2\sigma^2)}.$$

In the formula, "G" is a probability density of the Gaussian distribution, "u" and "v" are independent variables belonging to real number domain, and "a" is a parameter of the bivariate Gaussian distribution and is a real number greater than 0.

Noise reduction of the NDVI data of the sample remote sensing data may reduce influence of noise on a crop identification model (i.e., first multivariate Gaussian model described later) and improve a robustness of the crop identification model.

The fitting module 204 may fit a first multivariate Gaussian model based on the de-noised NDVI data of the sample remote sensing images.

In one embodiment, fitting the first multivariate Gaussian model based on the de-noised NDVI data of the sample remote sensing images may include: determining an average NDVI value of each first planting block according to the de-noised NDVI data of the sample remote sensing images; and fitting the first multivariate Gaussian model according to the average NDVI value of each first planting block of the sample remote sensing images.

In one embodiment, determining an average NDVI value of each first planting block according to the de-noised NDVI data of the sample remote sensing images may include sub-steps (11)-(13).

(11) For each first planting block, fitting a univariate Gaussian model according to de-noised NDVI data of the first planting block of a single date, where a mean of the univariate Gaussian model is an average value of the de-noised NDVI data of the first planting block, and a variance of the univariate Gaussian model is a variance of the de-noised NDVI data of the first planting block.

(12) Calculating a first distance from each pixel in the first planting block to a distribution center of the univariate Gaussian model according to the de-noised NDVI data of a single date of the first planting block.

(13) excluding the pixel from the first planting block if the first distance is greater than or equal to a first preset value (3 standard deviations, for example);

Sub-steps (11)-(13) may be repeated several times (for example, 3 times) to obtain a final univariate Gaussian model that is stable. A distribution center of the final univariate Gaussian model may be determined as the average NDVI value of the first planting block.

When repeating (11), a new univariate Gaussian model is fitted according to de-noised NDVI data of remaining pixels in the first planting block.

Excluding pixels that are too far from the distribution center of the univariate Gaussian model effectively reduces an impact of abnormal values of the sample remote sensing images and improves a robustness of the crop identification method.

In one embodiment, before fitting a univariate Gaussian model according to de-noised NDVI data of the first planting block of a single date, the crop identification method may further include: determining whether the quantity of pixels in the first planting block is less than a first preset number (50, for example); discarding the first planting block if the quantity of pixels in the first planting block is less than the first preset number.

In another embodiment, determining an average NDVI value of each first planting block according to the de-noised NDVI data of the sample remote sensing images may include sub-steps (21)-(23).

(21) For each first planting block, fitting a second multivariate Gaussian model according to noise-reduced NDVI data of all dates of the first planting block.

(22) calculating a second distance from each pixel in the first planting block to a distribution center of the second multivariate Gaussian model according to the noise-reduced NDVI data of all dates of the first planting block.

(23) excluding the pixel from the first planting block if the second distance is greater than or equal to a second preset value.

Sub-steps (21)-(23) may be repeated several times (for example, 3 times) to obtain a final second multivariate Gaussian model that is stable. A distribution center of the final second multivariate Gaussian model may be determined as the average NDVI value of the first planting block.

When repeating (21), a new second multivariate Gaussian model is fitted according to de-noised NDVI data of remaining pixels in the first planting block.

The second distance from each pixel in the first planting block to the distribution center of the second multivariate Gaussian model may be a square of a Mahalanobis distance from the pixel to the distribution center of the second multivariate Gaussian model.

Alternatively, the second distance from each pixel in the first planting block to the distribution center of the second multivariate Gaussian model may be a Mahalanobis distance from the pixel to the distribution center of the second multivariate Gaussian model.

Fitting the second multivariate Gaussian distribution means that, for each pixel, the de-noised NDVI data of all dates are used as features to estimate a mean and a covariance matrix of the second multivariate Gaussian distribution.

Method of fitting the second multivariate Gaussian distribution refers to known related technologies, and details are not described herein.

In one embodiment, before fitting the second multivariate Gaussian model according to the noise-reduced NDVI data of all dates of the first planting block, the crop identification method may further include: determining whether a quantity of pixels in the first planting block is less than a second preset number; discarding the first planting block if the quantity of pixels in the first planting block is less than the second preset number.

After the average NDVI value of each first planting block is obtained, the first multivariate Gaussian model may be fitted according to the average NDVI value of each first planting block.

The present disclosure fits the first multivariate Gaussian model for crop identification for two reasons: firstly, for a remote sensing image taken on each date, NDVI distributions of same crop may approximate to the Gaussian distribution; secondly, NDVI distributions of other crops of each date may be close to NDVI distributions of the specific crop, but in general, the NDVI distributions of other crops deviate from the NDVI distributions of the specific crop. Multivariate Gaussian model can make best use of the advantages and bypass the disadvantages, and achieve a better identification result.

In one embodiment, fitting the first multivariate Gaussian model according to the average NDVI value of each first planting block of the sample remote sensing images may include sub-steps (31)-(33).

(31) Calculating a covariance matrix and a mean of the first multivariate Gaussian model.

In one embodiment, the covariance matrix of the second multivariate Gaussian model may be calculated by:

$$\sum = \frac{1}{\sum_{i=1}^{N} n_i} \sum_{i=1}^{N} n_i (x_i - \mu^*)^T (x_i - \mu^*).$$

The mean of the first multivariate Gaussian model may be calculated as follows:

$$\mu^* = \frac{\sum_{i=1}^{N} n_i x_i}{\sum_{i=1}^{N} n_i}$$

In the above formula, "$x_i$" represents an average NDVI value of the (i)th first planting block, "$n_i$" represents a quantity of remaining pixels in the first planting block, and "N" represents a quantity of the first planting blocks.

(32) Calculating a third distance from the first planting block to a distribution center of the first multivariate Gaussian model according to average NDVI values of all dates of the first planting block.

The third distance from the first planting block to the distribution center of the first multivariate Gaussian model may be a Mahalanobis distance from the first planting block to the distribution center of the first multivariate Gaussian model squared.

Alternatively, the third distance from the first planting block to the distribution center of the first multivariate Gaussian model may be the Mahalanobis distance from the first planting block to the distribution center of the first multivariate Gaussian model.

(33) excluding the first planting block from the sample remote sensing images if the third distance is greater than or equal to a third preset value.

Sub-steps (31)-(33) may be repeated several times (for example, 3 times) to obtain a final first multivariate Gaussian model that is stable.

The second acquisition module 205 may acquire multi-temporal target remote sensing images (hereinafter, "target remote sensing images").

The target remote sensing images are images to be identified.

The target remote sensing images are a set of remote sensing images taken of a same geographical area on several dates. Each of the target remote sensing images corresponds to a certain date. In one embodiment, the target remote sensing image are taken at key phenological stages of the specific crop.

The target remote sensing images may include values of reflected radiation in different regions of the spectrum. In one embodiment, the target remote sensing images may include values of reflected radiation in blue, green, red, and near-infrared regions of the spectrum.

In one embodiment, the target remote sensing images may be GF-1 WFV images.

The second calculation module 206 may further calculate an NDVI value of each pixel in the target remote sensing images.

Calculating the NDVI value of each pixel in the target remote sensing images may refer to calculation of the NDVI value of each pixel in the sample remote sensing images.

In one embodiment, the computing device may pre-process the target remote sensing images before calculating the NDVI value of each pixel in the target remote sensing images.

In one embodiment, pre-processing the target remote sensing images may include: correcting the target remote sensing images; registering the target remote sensing images; cropping the target remote sensing images, and adjusting sizes of cropped target remote sensing images to a uniform size.

The second calculation module 206 may further construct an NDVI time series of each pixel in the target remote sensing images according to the NDVI value of each pixel in the target remote sensing images.

The NDVI time series of each pixel in the target remote sensing image may be obtained by sorting NDVI values of each pixel in the target remote sensing image in time sequence according to date when the target remote sensing image is taken.

The identification module 207 may input the NDVI time series of each pixel in the target remote sensing images to the first multivariate Gaussian model to obtain a likelihood value of each pixel in the remote sensing images.

The likelihood value indicates a likelihood that each pixel in the target remote sensing image is displaying the specific crop.

The first multivariate Gaussian model performs a prediction on each pixel in the target remote sensing images according to the NDVI time series of the pixel to obtain the likelihood value of the pixel.

The identification module 207 may further determine second planting blocks of the specific crop in the target remote sensing images according to the likelihood value of each pixel in the remote sensing images.

The second planting blocks are blocks of land in the target remote sensing images where the specific crop is planted.

In one embodiment, determining second planting blocks of the specific crop in the target remote sensing images according to the likelihood value of each pixel in the remote sensing images may include: determining the second planting blocks of the specific crop in the target remote sensing images according to the likelihood value of each pixel in the remote sensing images, using an image segmentation algorithm.

The first multivariate Gaussian model identifies whether a pixel in the target remote sensing images is displaying the specific crop based on characteristics of the pixel. As a result, the pixels identified as displaying the specific crop in the target remote sensing images may be geographically dispersed in some areas, which does not conform to a general rule of crop planting. Image segmentation makes use of geospatial information to make the second planting blocks of the specific crops in the target remote sensing image more complete and a crop identification result more accurate.

Image segmentation is to combine pixels with a certain similarity to form a region. A final classification result of each pixel depends not only on the likelihood value of the pixel, but also on neighboring pixels.

An energy equation for image segmentation is:

$$E(f) = \Sigma_{p \in E} \psi_1(z_p, c_p) + \Sigma_{p,q \in E} \psi_2(z_p, z_q)$$

In the energy equation, "$c_p$" represents two categories defined by the image segmentation algorithm, namely specific crop and non-specific crop. "$z_p$" and "$z_q$" represents pixels in the target remote sensing images. "$\psi_1$" represents the likelihood value of each pixel in the target remote sensing images. "$\psi 2$" represents a correlation between two pixels, defined as $\exp(-|z_p - z_q|)$, which means that the closer two pixels are, the greater is the correlation, and the more easily can the two pixels be classified into one category.

The second planting blocks may be segmented from the target remote sensing images according to the min-cut/max-flow theorem.

In other embodiments, if the likelihood value of a pixel in the target remote sensing images is greater than or equal to a preset threshold (0.8, for example), the pixel may be identified as displaying the specific crop. Otherwise, if the likelihood value of the pixel is less than the preset threshold, the pixel is identified as displaying a non-specific crop.

The present disclosure uses multi-temporal remote sensing images to identify type. A phenomenon of "same objects different spectral values" and "different objects same spectral values" in crop identification based on mono-temporal temporal images is overcome. The present disclosure establishes a statistical model based on multi-temporal sample remote sensing images, and no part of the entire process requires the assistance of professional agronomic knowledge. Therefore, the model is easily applied to other geographical areas or crops. An accurate and robust identification result is achieved.

Figure 3:
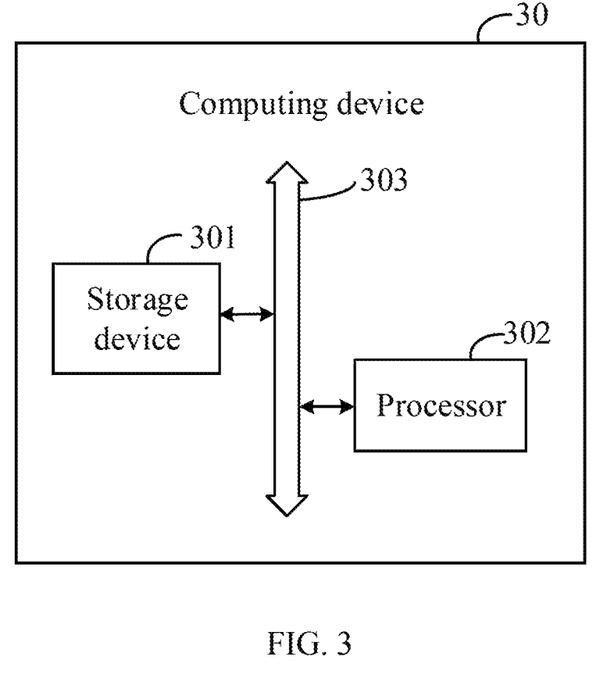
FIG. 3 is a block diagram of an embodiment of a computing device utilizing the method of FIG. 1.

FIG. 3 is a block diagram of one example embodiment of a computing device utilizing the method of FIG. 1. In an embodiment, a computing device 30 includes a storage device 301, at least one processor 302, and at least one bus 303. It should be understood by those skilled in the art that the structure of the computing device 30 shown in FIG. 3 does not constitute a limitation of the embodiment of the present disclosure. The computing device 30 may have a bus type structure or a star type structure, and the computing device 30 may further include other hardware or software, or another computing device 30 may have different component arrangements.

In at least one embodiment, the computing device 30 can include a terminal that is capable of automatically performing numerical calculations and/or information processing in accordance with pre-set or stored instructions. The hardware of terminal can include, but is not limited to, a microprocessor, an application specific integrated circuit, programmable gate arrays, digital processors, and embedded devices.

It should be noted that the computing device 30 is merely an example, other existing or future electronic examples are included in the scope of the present disclosure, and are included in the reference.

In some embodiments, the storage device 301 can be used to store program codes of computer readable programs and various data, such as the system 20 installed in the computing device 30, and automatically access the programs or data with high speed during running of the computing device 30. The storage device 301 can include a read-only memory (ROM), a programmable read-only memory (PROM), an erasable programmable read only memory (EPROM), an one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other storage medium readable by the computing device 30 that can be used to carry or store data.

In some embodiments, the at least one processor 302 may be composed of an integrated circuit, for example, may be composed of a single packaged integrated circuit, or may be composed of multiple integrated circuits of same function or different functions. The at least one processor 302 can include one or more central processing units (CPU), a microprocessor, a digital processing chip, a graphics processor, and various control chips. The at least one processor 302 is a control unit of the computing device 30 which connects various components of the computing device 30 using various interfaces and lines. By running or executing a computer program or modules stored in the storage device 301, and by invoking the data stored in the storage device 301, the at least one processor 302 can perform various functions of the computing device 30 and process data of the computing device 30. For example, the functions of performing crop identification.

In some embodiments, the bus 303 is used to achieve communication between the storage device 301 and the at least one processor 302, and other components of the computing device 30.

Although not shown, the computing device 30 may further include a power supply (such as a battery) for powering various components. Preferably, the power supply may be logically connected to the at least one processor 302 through a power management device, thereby, the power management device manages functions such as charging, discharging, and power management. The power supply may include one or more a DC or AC power source, a recharging device, a power failure detection circuit, a power converter or inverter, a power status indicator, and the like. The computing device 30 may further include various sensors, such as a BLUETOOTH module, a WI-FI module, and the like, and details are not described herein.

It should be understood that the described embodiments are for illustrative purposes only and are not limited in the scope of the present disclosure.

In at least one embodiment, as shown in FIG. 3, the at least one processor 302 can execute various types of applications (such as the system 20) installed in the computing device 30, program codes, and the like. For example, the at least one processor 302 can execute the modules 201-207 of the system 20.

In at least one embodiment, the storage device 301 stores program codes. The at least one processor 302 can invoke the program codes stored in the storage device to perform functions. For example, the modules described in FIG. 2 are program codes stored in the storage device 301 and executed by the at least one processor 302, to implement the functions of the various modules for the purpose of crop identification.

In at least one embodiment, the storage device 301 stores one or more instructions (i.e., at least one instruction) that are executed by the at least one processor 302 to achieve the purposes of crop identification.

In at least one embodiment, the at least one processor 302 can execute the at least one instruction stored in the storage device 301 to perform the operations shown in FIG. 1.

A non-transitory storage medium having stored thereon instructions that, when executed by a processor of a computing device, causes the computing device to perform an image generation method, the method includes: acquiring multi-temporal sample remote sensing images labeled with first planting blocks of a specific crop; calculating a normalized difference vegetation index (NDVI) value of each pixel in the sample remote sensing images to obtain NDVI data of the sample remote sensing images; reducing noise of the NDVI data of the sample remote sensing images to obtain de-noised NDVI data of the sample remote sensing images; fitting a first multivariate Gaussian model based on the de-noised NDVI data of the sample remote sensing images; acquiring multi-temporal target remote sensing images; calculating an NDVI value of each pixel in the target remote sensing images; constructing an NDVI time series of each pixel in the target remote sensing images according to the NDVI value of each pixel in the target remote sensing images; inputting the NDVI time series of each pixel in the target remote sensing images to the first multivariate Gaussian model to obtain a likelihood value of each pixel in the remote sensing images; and determining second planting blocks of the specific crop in the target remote sensing images according to the likelihood value of each pixel in the remote sensing images.

The steps in the method of the embodiments of the present disclosure may be sequentially adjusted, merged, and deleted according to actual needs.

The above description is mere embodiments of the present disclosure, and is not intended to limit the present disclosure, various modifications and changes can be made to the present disclosure. Any modifications, equivalent substitutions, improvements, etc. made within the spirit and scope of the present disclosure are intended to be included within the scope of the present disclosure.

What is claimed is:

1. A crop identification method being executed by a computing device, the method comprising:
    acquiring multi-temporal sample remote sensing images labeled with first planting blocks of a specific crop;
    calculating a normalized difference vegetation index (NDVI) value of each pixel in the sample remote sensing images to obtain NDVI data of the sample remote sensing images;
    reducing noise of the NDVI data of the sample remote sensing images to obtain de-noised NDVI data of the sample remote sensing images;
    fitting a first multivariate Gaussian model based on the de-noised NDVI data of the sample remote sensing images, comprising: determining an average NDVI value of each first planting block according to the de-noised NDVI data of the sample remote sensing images;
    acquiring multi-temporal target remote sensing images;
    calculating an NDVI value of each pixel in the target remote sensing images;
    constructing an NDVI time series of each pixel in the target remote sensing images according to the NDVI value of each pixel in the target remote sensing images;
    inputting the NDVI time series of each pixel in the target remote sensing images to the first multivariate Gaussian model to obtain a likelihood value of each pixel in the remote sensing images; and
    determining second planting blocks of the specific crop in the target remote sensing images according to the likelihood value of each pixel in the remote sensing images;
    wherein determining the average NDVI value of each first planting block according to the de-noised NDVI data of the sample remote sensing images comprises:
    for each first planting block, fitting a univariate Gaussian model according to de-noised NDVI data of the first planting block of a single date, wherein a mean of the univariate Gaussian model is an average value of the de-noised NDVI data of the first planting block, and a variance of the univariate Gaussian model is a variance of the de-noised NDVI data of the first planting block;
    calculating a first distance from each pixel in the first planting block to a distribution center of the univariate Gaussian model according to the de-noised NDVI data of the single date of the first planting block; and
    excluding the pixel from the first planting block if the first distance is greater than or equal to a first preset value.

2. The method according to claim 1, wherein reducing noise of the NDVI data of the sample remote sensing images comprises:
performing a Gaussian smoothing on the NDVI data of the sample remote sensing images.

3. The method according to claim 1, wherein fitting the first multivariate Gaussian model based on the de-noised NDVI data of the sample remote sensing images further comprises:
fitting the first multivariate Gaussian model according to the average NDVI value of each first planting block of the sample remote sensing images.

4. The method according to claim 3, wherein fitting the first multivariate Gaussian model according to the average NDVI value of each first planting block of the sample remote sensing images comprises:
calculating a covariance matrix and a mean of the first multivariate Gaussian model;
calculating a third distance from the first planting block to a distribution center of the first multivariate Gaussian model according to average NDVI values of all dates of the first planting block; and
excluding the first planting block from the sample remote sensing images if the third distance is greater than or equal to a third preset value.

5. A computing device comprising:
a storage device;
at least one processor; and
the storage device storing one or more programs, which when executed by the at least one processor, cause the at least one processor to perform operations comprising:
acquiring multi-temporal sample remote sensing images labeled with first planting blocks of a specific crop;
calculating a normalized difference vegetation index (NDVI) value of each pixel in the sample remote sensing images to obtain NDVI data of the sample remote sensing images;
reducing noise of the NDVI data of the sample remote sensing images to obtain de-noised NDVI data of the sample remote sensing images;
fitting a first multivariate Gaussian model based on the de-noised NDVI data of the sample remote sensing images, comprising: determining an average NDVI value of each first planting block according to the de-noised NDVI data of the sample remote sensing images;
acquiring multi-temporal target remote sensing images;
calculating an NDVI value of each pixel in the target remote sensing images;
constructing an NDVI time series of each pixel in the target remote sensing images according to the NDVI value of each pixel in the target remote sensing images;
inputting the NDVI time series of each pixel in the target remote sensing images to the first multivariate Gaussian model to obtain a likelihood value of each pixel in the remote sensing images; and
determining second planting blocks of the specific crop in the target remote sensing images according to the likelihood value of each pixel in the remote sensing images;
wherein determining the average NDVI value of each first planting block according to the de-noised NDVI data of the sample remote sensing images comprises:
for each first planting block, fitting a univariate Gaussian model according to de-noised NDVI data of the first planting block of a single date, wherein a mean of the univariate Gaussian model is an average value of the de-noised NDVI data of the first planting block, and a variance of the univariate Gaussian model is a variance of the de-noised NDVI data of the first planting block;
calculating a first distance from each pixel in the first planting block to a distribution center of the univariate Gaussian model according to the de-noised NDVI data of the single date of the first planting block; and
excluding the pixel from the first planting block if the first distance is greater than or equal to a first preset value.

6. The computing device according to claim 5, wherein reducing noise of the NDVI data of the sample remote sensing images comprises:
performing a Gaussian smoothing on the NDVI data of the sample remote sensing images.

7. The computing device according to claim 5, wherein fitting the first multivariate Gaussian model based on the de-noised NDVI data of the sample remote sensing images further comprises:
fitting the first multivariate Gaussian model according to the average NDVI value of each first planting block of the sample remote sensing images.

8. The computing device according to claim 7, wherein fitting the first multivariate Gaussian model according to the average NDVI value of each first planting block of the sample remote sensing images comprises:
calculating a covariance matrix and a mean of the first multivariate Gaussian model;
calculating a third distance from the first planting block to a distribution center of the first multivariate Gaussian model according to average NDVI values of all dates of the first planting block; and
excluding the first planting block from the sample remote sensing images if the third distance is greater than or equal to a third preset value.

9. A non-transitory storage medium having stored thereon instructions that, when executed by a computing device of a computing device, causes the computing device to perform a crop identification method, the method comprising:
acquiring multi-temporal sample remote sensing images labeled with first planting blocks of a specific crop;
calculating a normalized difference vegetation index (NDVI) value of each pixel in the sample remote sensing images to obtain NDVI data of the sample remote sensing images;
reducing noise of the NDVI data of the sample remote sensing images to obtain de-noised NDVI data of the sample remote sensing images;
fitting a first multivariate Gaussian model based on the de-noised NDVI data of the sample remote sensing images, comprising: determining an average NDVI value of each first planting block according to the de-noised NDVI data of the sample remote sensing images;
acquiring multi-temporal target remote sensing images;
calculating an NDVI value of each pixel in the target remote sensing images;
constructing an NDVI time series of each pixel in the target remote sensing images according to the NDVI value of each pixel in the target remote sensing images;
inputting the NDVI time series of each pixel in the target remote sensing images to the first multivariate Gaussian model to obtain a likelihood value of each pixel in the remote sensing images; and determining second planting blocks of the specific crop in the target remote sensing images according to the likelihood value of each pixel in the remote sensing images;

wherein determining the average NDVI value of each first planting block according to the de-noised NDVI data of the sample remote sensing images comprises:

for each first planting block, fitting a univariate Gaussian model according to de-noised NDVI data of the first planting block of a single date, wherein a mean of the univariate Gaussian model is an average value of the de-noised NDVI data of the first planting block, and a variance of the univariate Gaussian model is a variance of the de-noised NDVI data of the first planting block;

calculating a first distance from each pixel in the first planting block to a distribution center of the univariate Gaussian model according to the de-noised NDVI data of the single date of the first planting block; and excluding the pixel from the first planting block if the first distance is greater than or equal to a first preset value.

10. The non-transitory storage medium according to claim 9, wherein fitting the first multivariate Gaussian model based on the de-noised NDVI data of the sample remote sensing images further comprises:

fitting the first multivariate Gaussian model according to the average NDVI value of each first planting block of the sample remote sensing images.

11. The non-transitory storage medium according to claim 10, wherein fitting the first multivariate Gaussian model according to the average NDVI value of each first planting block of the sample remote sensing images comprises:

calculating a covariance matrix and a mean of the first multivariate Gaussian model;

calculating a third distance from the first planting block to a distribution center of the first multivariate Gaussian model according to average NDVI values of all dates of the first planting block; and excluding the first planting block from the sample remote sensing images if the third distance is greater than or equal to a third preset value.

* * * * *